Aug. 2, 1960   R. M. CARRIER, JR   2,947,410
DRIVE MEANS FOR VIBRATORY APPARATUS
Filed Sept. 30, 1957
2 Sheets-Sheet 1
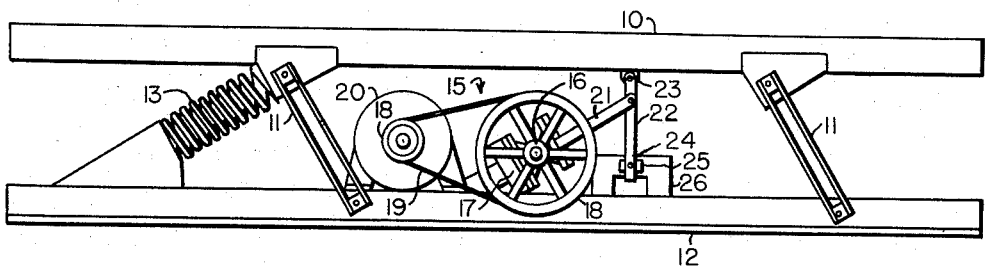
*Fig. I*
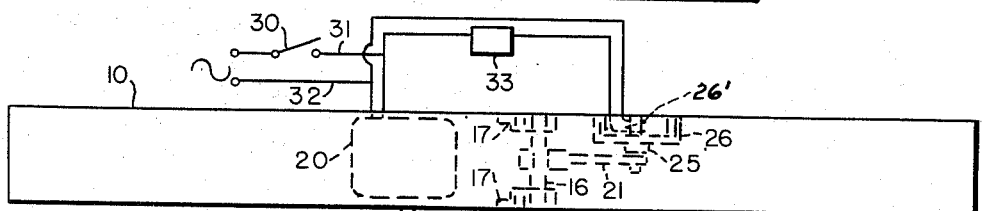
*Fig. II*
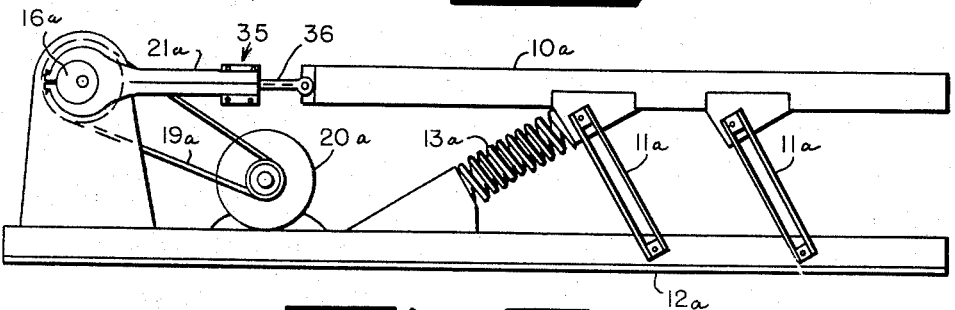
*Fig. III*
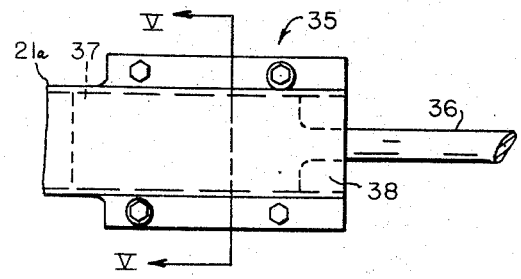
*Fig. IV*
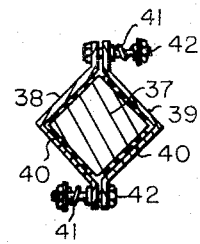
*Fig. V*
INVENTOR.
ROBERT M. CARRIER JR.
BY
ATTORNEYS

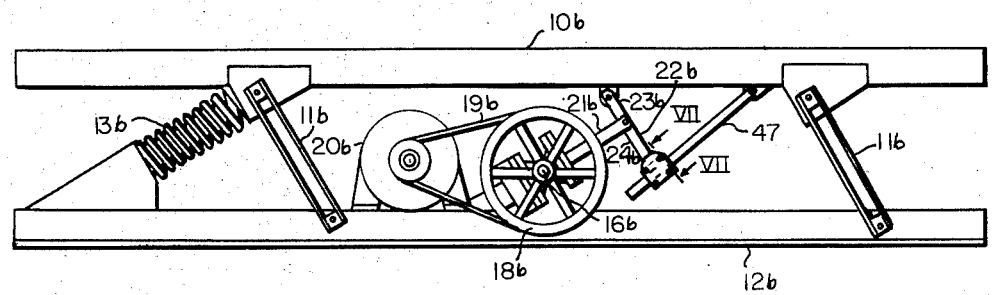
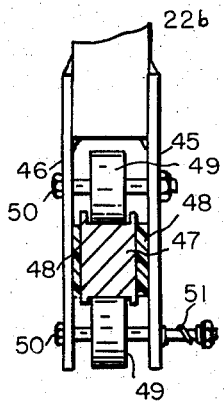
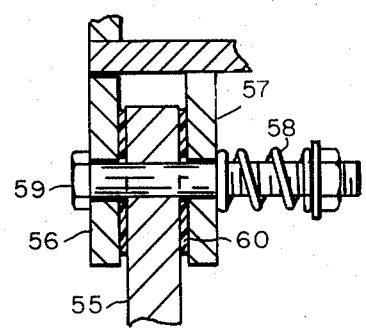
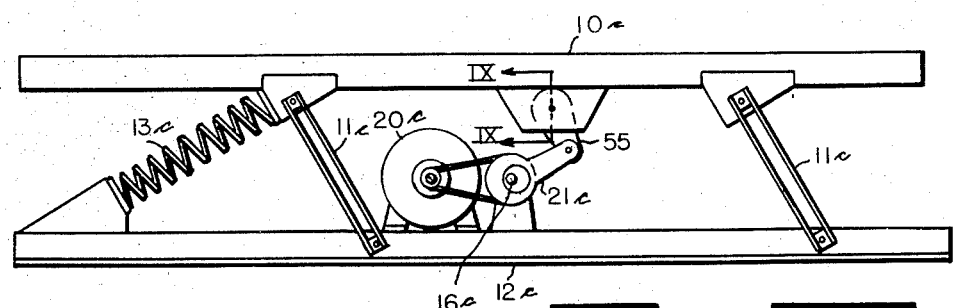
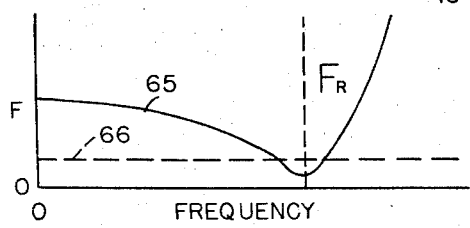
INVENTOR.
ROBERT M. CARRIER JR.
BY
ATTORNEYS United States Patent Office 2,947,410
Patented Aug. 2, 1960

2,947,410

DRIVE MEANS FOR VIBRATORY APPARATUS

Robert M. Carrier, Jr., Louisville, Ky., assignor, by mesne assignments, to Chain Belt Company, Milwaukee, Wis.

Filed Sept. 30, 1957, Ser. No. 686,909

3 Claims. (Cl. 198—220)

This invention relates to drive mechanism for vibratory apparatus such as conveyors, screens, shakeout devices and similar vibratory apparatus and in particular to means for coupling a positive amplitude vibration exciter to a generally resonant vibratory structure.

Vibratory conveyors and similar apparatus that perform work by vibration are often constructed to operate substantially at their natural frequences as determined by the weights of the vibratory members and the resiliency of the springs or other resilient supports that carry the members. Vibration of a vibratory member may be excited by rotating eccentric weights which apply a constant force regardless of the amplitude of vibration or by means of eccentrics or crank motion devices that drive the structure at a certain amplitude of vibration regardless of the amount of force required to produce such amplitude of motion. The first type of drive suffers from the disadvantage that the amplitude of vibration varies markedly with changes in the frictional losses or work performed by the system and therefore when wide variations in loading are apt to occur it is desirable to use a positive amplitude vibration generator.

The principal difficulty in using a positive amplitude generator with a resonant system is that the drive must be made strong enough to withstand the full force of the resilient support springs during starting and stopping operations. At the normal operating speed the inertia force of the vibrated body counteracts the spring force of the resilient support so that the drive need supply only enough force to maintain the vibration and overcome the losses in the system. Since the starting force may be many times the required driving force at normal operating speed, it is desirable to incorporate in the drive means a connection that yields during starting and stopping and yet is a substantially rigid connection during normal operating conditions.

The principal object of this invention is to provide a yieldable drive means for a positive amplitude vibratory source that is adapted to yield only when the transmitted force tends to exceed a predetermined maximum.

Another object of the invention is to provide a positive amplitude vibratory source with a yieldable riving connection that incorporates a slidable friction joint that is capable of sliding to limit the amplitude of the force transmitted from the vibratory source to the vibrated work member.

Another object of the invention is to provide a friction connection in the drive between a positive amplitude vibration exciter and a member to be vibrated arranged such that the magnitude of the frictional force may be varied while the system is in operation.

These and more specific objects and advantages are apparent from the following description of a preferred form of the invention.

According to the invention, a vibratory work performing mechanism is coupled to a positive amplitude vibration generator by means of mechanism incorporating a friction coupling adjusted to transmit only sufficient force to maintain the vibratory work performing member in vibration at the desired amplitude.

Preferred embodiments of the invention are illustrated in the accompanying drawings.

In the drawings:

Figure I is a side elevation, in schematic form, of a vibratory conveyor constructed according to the invention.

Figure II is a schematic plan view, including wiring, for the conveyor illustrated in Figure I.

Figure III is a side elevation, in schematic form, of another form of vibratory conveyor incorporating a drive according to the invention.

Figure IV is an enlarged fragmentary detail of the driving connection indicated in Figure III.

Figure V is a vertical section taken along the line V—V of Figure IV.

Figure VI is a side elevation, in schematic form, of another form of friction drive for coupling a positive amplitude vibration exciter to a vibratory conveyor.

Figure VII is a fragmentary detail as seen from the line VII—VII of Figure VI.

Figure VIII is a schematic diagram of still another form of vibratory drive embodying a rotary friction connection in the drive between a positive amplitude vibration exciter and a work performing member.

Figure IX is an enlarged vertical section taken along the line IX—IX of Figure VIII.

Figure X is a graph illustrating the forces versus frequency relationship in the various type of vibratory structures.

These specific figures and the accompanying description are intended merely to illustrate the invention and not to impose limitations on its scope.

Referring now to Figure I, a conveyor deck 10 representative of a part to be vibrated and to perform work by such vibration is supported on a plurality of leaf springs 11 from a base 12 which may either be rigidly mounted on a foundation or resiliently mounted so as to isolate the vibration from the foundation. In addition to the leaf springs 11, a helical spring or group of springs 13 is arranged to resiliently hold the conveyor deck 10 in position and cooperate with the deck 10 in forming a generally resonant vibratory structure.

A positive amplitude vibration generator 15 includes an eccentric shaft 16, journaled in pillow blocks 17, connected through pulleys 18 and belt 19 to a motor 20. The eccentric shaft 16 is coupled through a connecting rod 21 to a lever 22, an upper end 23 of which is pivotally connected to the conveyor deck 10 and the lower end 24 of which is pivotally connected to an armature 25 bearing on the face of an electromagnet 26. The controls for the motor 20 and magnet 26, as illustrated schematically in Figure II, include a switch 30 that controls the flow of power from an alternating current source through leads 31 and 32 to the motor 20 and a timing device 33 that delays the application of power to a coil 26' of the electromagnet 26.

In this structure, when there is no power applied to the electromagnet 26 its armature 25 is free to slide across the face of the magnet thereby, in effect, disconnecting the conveyor deck 10 from the eccentrically driven connecting rod 21. When the switch 30 is closed to put the system in operation by starting the motor 20 the timing device 33 delays the energization of the electromagnet 26 long enough to permit the motor to come up to operating speed before the friction between the armature 25 and the face electromagnet 26 becomes appreciable. During this interval the lever 22 swings freely from its upper pivot 23 and the conveyor moves only slightly.

After a brief time delay the timing device 33 permits current to flow to the electromagnet 26 thereby increasing the friction of its armature 25 against its face and causing the lever 22 to transmit force to the conveyor deck 10. The amount of friction force developed by the electromagnet is adjusted so that the force transmitted by the lever 22 to the conveyor deck 10 is slightly more than that required to maintain the conveyor deck in vibratory operation with the armature 25 held stationary on the face of the electromagnet 26.

Preferably in this type of operation, the conveyor deck 10 and the spring 13 are adjusted or selected so that the system is resonant at the operating speed. Therefore, the lever 22 need transmit to the conveyor deck 10 only sufficient force to overcome the losses in the system but not enough to overcome the inertia force of the conveyor deck 10 or the spring force of the spring or springs 13. Therefore, as the system is started and the electromagnet 26 is energized the lever 22 swings in decreasing amplitude strokes as the vibration of the conveyor deck increases in amplitude until finally the lower end of the lever 24 remains stationary and the conveyor operates at its desired operating amplitude.

When it is desired to stop the conveyor, the motor 20 is deenergized by opening the switch 30 which also deenergizes the electromagnet 26. This, in effect, decouples the vibratory system from the eccentrically driven connecting rod 21 so that the amplitude of vibration of the conveyor 10 may decrease at constant frequency and variable amplitude while the eccentric shaft 16 slows down in speed while maintaining constant amplitude of motion of the connecting rod 21. During this period the lever 22 oscillates at a frequency corresponding to the difference in speed between the vibratory frequency of the conveyor 10 and the speed of the shaft 16. Depending upon the phase relations, the amplitude of oscillation of the lever may rise to a maximum which is nearly double the amplitude of motion that would result if the conveyor deck 10 or shaft 16 were stationary.

In this arrangement the maximum force that is ever transmitted from the eccentric shaft 16 through connecting rod 21 is a force proportional to the frictional force between the armature 25 and the magnet 26 and this force may, by design, be made quite small relative to the maximum inertia forces developed in the conveyor. This permits a relatively small vibratory generator to be employed and operated near its full load condition as the conveyor is operating. The generator need not have the peak load capacity that would be required to start or stop the conveyor in the event the lower end of the lever 22 were held stationary on the eccentric connecting rod 21 connected directly to the conveyor deck 10.

This example of a friction drive employing an electromagnetic clutch is illustrated in my copending application Serial No. 328,766 filed December 30, 1952 of which this application is a continuation-in-part.

The friction drive may take many forms and still provide the desired force limiting connection between a positive amplitude vibration exciter and a member to be vibrated. While a system as shown in Figures I and II provides the advantage that the drive is completely disconnected while the motor is being started or stopped, in practice with motors that are capable of starting under full load torque the friction device may be preset to a given force transmission and left at that setting during starting and stopping. One form of such an arrangement is illustrated in Figures III, IV and V. In these figures a conveyor deck 10a is supported on leaf springs 11a from a base 12a. A helical spring 13a connected between the base 12a and the conveyor deck 10a provides a resilient force which, at operating speed, counteracts or balances the inertia force of the conveyor deck 10a to make a generally resonant vibratory structure. The system is maintained in vibration by a drive motor 20a that is coupled through a belt 19a to an eccentric shaft 16a which is connected through a connecting rod 21a and frictional slip joint 35 to a second rod 36 that is pivotally connected to the conveyor deck 10a. The second connecting rod 36, as may be seen in Figures IV and V, has an elongated rectangular cross sectioned enlarged end 37 that is telescopically engaged between side plates 38 and 39 forming the end of the first connecting rod 21a. Pieces 40 of brake lining or similar wear resistant material are interposed between adjacent surfaces of the rectangular end 37 of the rod 36 and the interior surfaces of the side plates 38 and 39 of the connecting rod 21a. Gripping pressure is maintained by springs 41 sleeved over bolts 42 used to hold the side plates 38 and 39 together. By making the springs 41 of fairly low rate a relatively constant force may be applied to the brake lining material and thus maintain a substantially constant frictional force at the point of slippage between the connecting rods 21a and 36.

In this arrangement, as in that preceding, the friction force developed at the point of slippage between the frictionally connected members is just sufficient to maintain the conveyor deck 10a in full amplitude of vibration under the heaviest condition of loading to be encountered in service. This frictional force is not sufficient to overcome either the spring force of the spring 13a or the inertia force of the conveyor 10a when the system is operating at speeds removed from or remote from the normal operating speed at which the system is resonant. Therefore, during starting and stopping, slipping occurs in the frictional joint but at normal operating speed with the conveyor operating at full stroke there is no slipping and thus no energy lost in the slipable connection and it behaves as the equivalent of a solid connection between the eccentric 16a and the conveyor deck 10a. This permits the system to be operated exactly at the resonant speed or resonant frequency since any decrease in loading or power requirements of the conveyor 10a merely result in decreased force transmitted and not an increase in amplitude of vibration as occurs when a resilient drive is employed between the eccentric and the conveyor.

Another example, somewhat similar to that shown in Figure I, is shown in Figures VI and VII. In this example, a conveyor deck 10b is supported on leaf springs 11b from a base 12b. A helical spring or springs 13b connected between the base 12b and the conveyor deck 10b cooperates with the conveyor deck to form a resonant system having a natural frequency in the operating speed range. As in Figure I, a motor 20b is arranged to drive an eccentric shaft 16b by means of pulleys 18b and belt 19b. The eccentric shaft 16b is connected through the connecting rod 21b to an intermediate point of a lever 22b. An upper end 23b of the lever 22b is connected to the conveyor deck 10b while its lower end 24b is bifurcated forming a pair of side plates 45 and 46; (see Figure VII) that straddle a bar 47, the upper end of which is hingedly connected to the conveyor deck 10b. The bar 47, passing between the lever side plates, is separated from the adjacent surfaces of the side plates 45 and 46 by pieces 48 of brake lining or similar frictional wear resisting material that is attached to the side plates 45 and 46. The bar is held in alignment by a pair of rollers 49 journaled on bolts 50 passing through the side plates 45 and 46. A spring 51 sleeved over the lower one of the bolts 50 serves to push the side plates 45 and 46 toward each other to apply pressure to the brake lining material 48 and thus generate sufficient frictional force to transmit the required force from the lever 22b to the bar 47 to drive the conveyor deck 10b at the desired amplitude of vibration.

Still another form of friction drive is illustrated in Figure VIII. In the example shown in Figure VIII, a conveyor deck 10c is carried on and guided by leaf springs 11c erected from a base 12c. As was previously mentioned, the base 12c may either be rigidly attached to a foundation or be resiliently supported on vibration isolating mountings so as to confine the vibratory movement to the vibratory assembly. The conveyor deck 10c is connected through a spring 13c to the base 12c, the spring 13c having such a rate or elasticity that it may combine with the mass of the conveyor deck 10c to form a vibratory system having a natural frequency at the operating speed of the equipment. Vibratory movement of the conveyor 10c is produced by an eccentric shaft 16c that is driven by a motor 20c and that is connected through a connecting rod 21c to an arm 55 depending from and pivoted to the conveyor deck 10c. As indicated in Figure IX, the upper end of the arm 55, the end pivotally attached to the conveyor deck 10c, is held between a first member 56 that is rigidly attached to the conveyor deck 10c and a second member 57 that is yieldably attached to the conveyor so that it may be urged by a spring 58 into gripping engagement with the upper end of the arm 55. The arm 55 is pivoted on a bolt 59 passing through the plates 56 and 57 and through the spring 58. Pieces 60 of brake lining or similar material are interposed between the adjacent faces of the arm 55 and the side plates 56 and 57.

As in the preceding examples, the tension of the spring 58 is adjusted by tightening the nut on the bolt 59 until sufficient friction is produced between the brake lining material 60 and the sides of the arm 55 so that it transmits sufficient force to maintain the conveyor 10c at its working amplitude of vibration. As was indicated previously, the required force to maintain such vibration is less than that required to overcome either the inertia force of the conveyor 10c or the force of the springs 13c.

In this assembly, when the motor 20c is first started and before the conveyor has a chance to build up its resonant vibration, the arm 55 rotates or oscillates about the bolt 59 to accommodate the fixed amplitude movement of connecting rod 21c. After the motor reaches operating speed the repeated forces applied through the arm 55 cause the conveyor 10c to vibrate and as the resonant vibration builds up to an amplitude corresponding to the movement of the connecting rod 21c the relative motion between the arm 55 and the conveyor deck 10c reduces to zero and the arm then acts as an integral part of the conveyor deck 10c. This system may operate exactly at the resonant frequency of the conveyor 10c without danger of excessive amplitude because no more force can be transmitted from the eccentric to the conveyor than that required to maintain the selected amplitude as fixed by the stroke of the eccentric 16c.

Figure X illustrates, in a graphical way, the relationship between the forces required for the drive at various frequencies of operation. In this graph the ordinates represent the force and the abscissa the frequency of operation. A solid curve 65 represents the force required at various frequencies to maintain a prescribed amplitude of vibration of conveyor deck 10. At zero frequency, as when the system is first being started, it requires an amount of force indicated by the curve 65 to overcome the spring force of the spring 13 and the leaf springs 11. The spring force is always directed toward the neutral position of the spring. In contrast the inertia force, which varies as the square of the speed, exerted by the conveyor deck 10 is in a direction away from the neutral position and thus is in opposition to the spring force. Therefore, as the speed is increased from zero the inertia force becomes appreciable and subtracts from the spring force until at the resonant frequency, indicated by the dotted line Fr the two forces are substantially equal. At this frequency the only force required to maintain vibration is that required to overcome the losses in the system. At still higher frequencies, the inertia force of the conveyor deck 10 predominates over the spring force and hence the force required to vibrate the system to a given amplitude at the higher frequencies becomes quite large as indicated by the sharply rising branch of the curve 65 lying to the right of the natural frequency ordinant. The force transmission capacity of the frictional connections is indicated by the horizontal dotted line 66 which indicates that only in the region near resonance can the frictional connections transmit sufficient force to maintain the desired operating amplitude. Only in the frequency range where the curve 65 dips below the dotted line 66, representing the maximum force transmitted by the frictional connection, does the total force applied to the conveyor 10c drop below that which can be transmitted through the friction joint. In this region only sufficient force is applied to maintain vibration. At all other speeds of operation the amplitude of vibration decreases and slippage in the friction connection accommodates the differences in amplitude of stroke of the conveyor and connecting rod without transmitting excessive force to the eccentric drive.

Various modifications in the structure and arrangement of the friction joint may be made without departing from the spirit and scope of the invention.

Having described the invention, I claim:

1. In a device for doing work by vibration, in combination, a work member to be vibrated; resilient means for supporting the member and forming with the member a vibratory system having a natural frequency; a positive amplitude vibration exciter that is operable at said natural frequency; coupling means connecting the exciter to the work member; said coupling means including a lever having a first pivot point connected to the work member, a second pivot point connected to the exciter, and a third pivot point; an armature connected to said third pivot point; and an electromagnetic clutch cooperating with said armature and adapted when energized to restrict movement of said armature whereby said third pivot point becomes a fulcrum as the lever transmits force to the work member.

2. A device according to claim 1 in which the positive amplitude exciter and the electromagnetic clutch are subject to a common control.

3. A device according to claim 2 having means in circuit with the electromagnetic clutch to delay its energization for a time interval after the positive amplitude exciter is started.

References Cited in the file of this patent

UNITED STATES PATENTS

| | | |
|---|---|---|
| 1,757,392 | Schieferstein | May 6, 1930 |
| 2,705,070 | Carrier et al. | Mar. 29, 1955 |
| 2,725,984 | Klemencic | Dec. 6, 1955 |
| 2,751,068 | Haddox | June 19, 1956 |
| 2,797,796 | Carrier et al. | July 2, 1957 |